March 6, 1934.   C. E. L. LIPMAN   1,949,724
REFRIGERATOR CIRCUIT BREAKER
Filed June 29, 1931   3 Sheets-Sheet 1
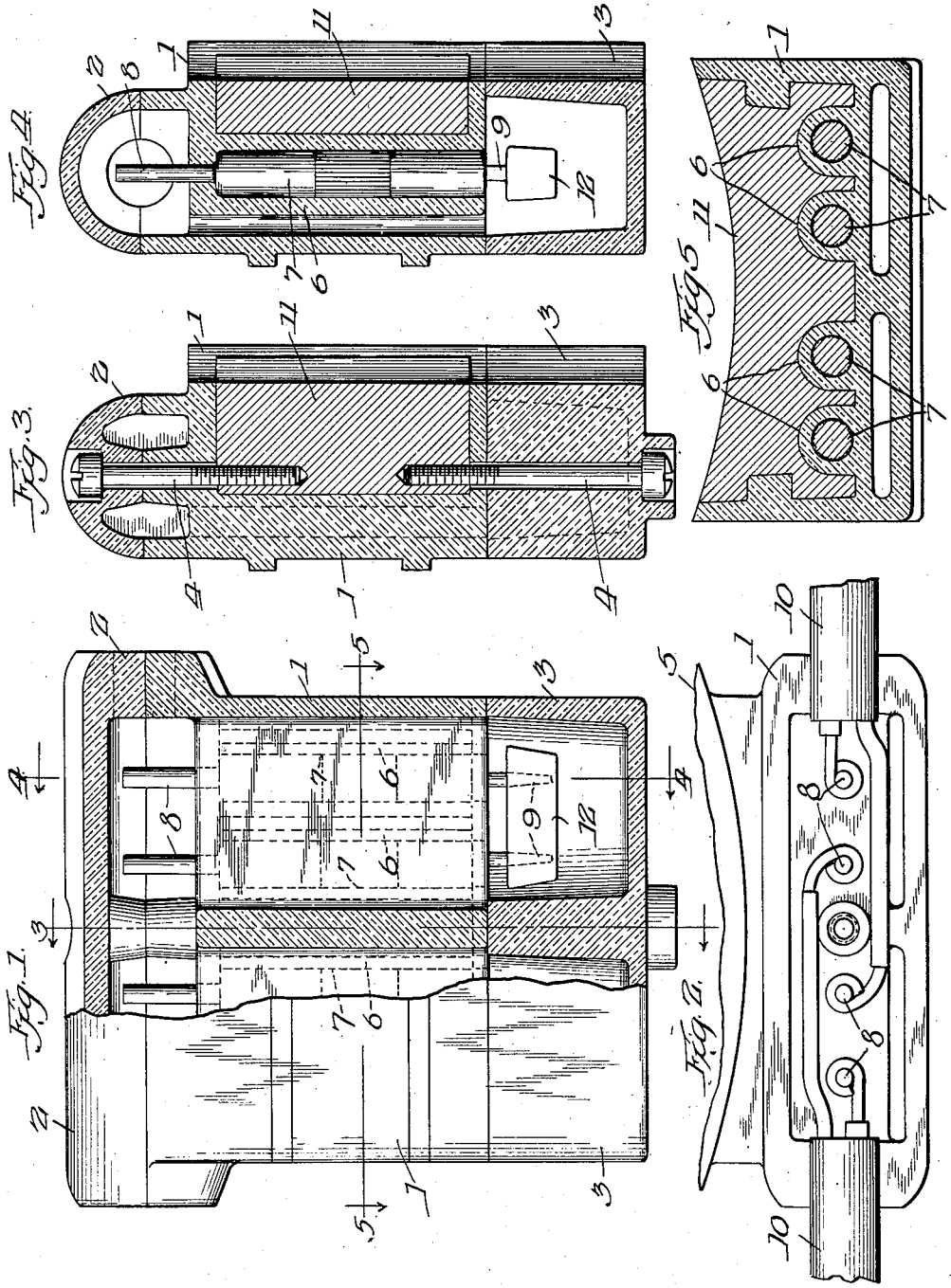

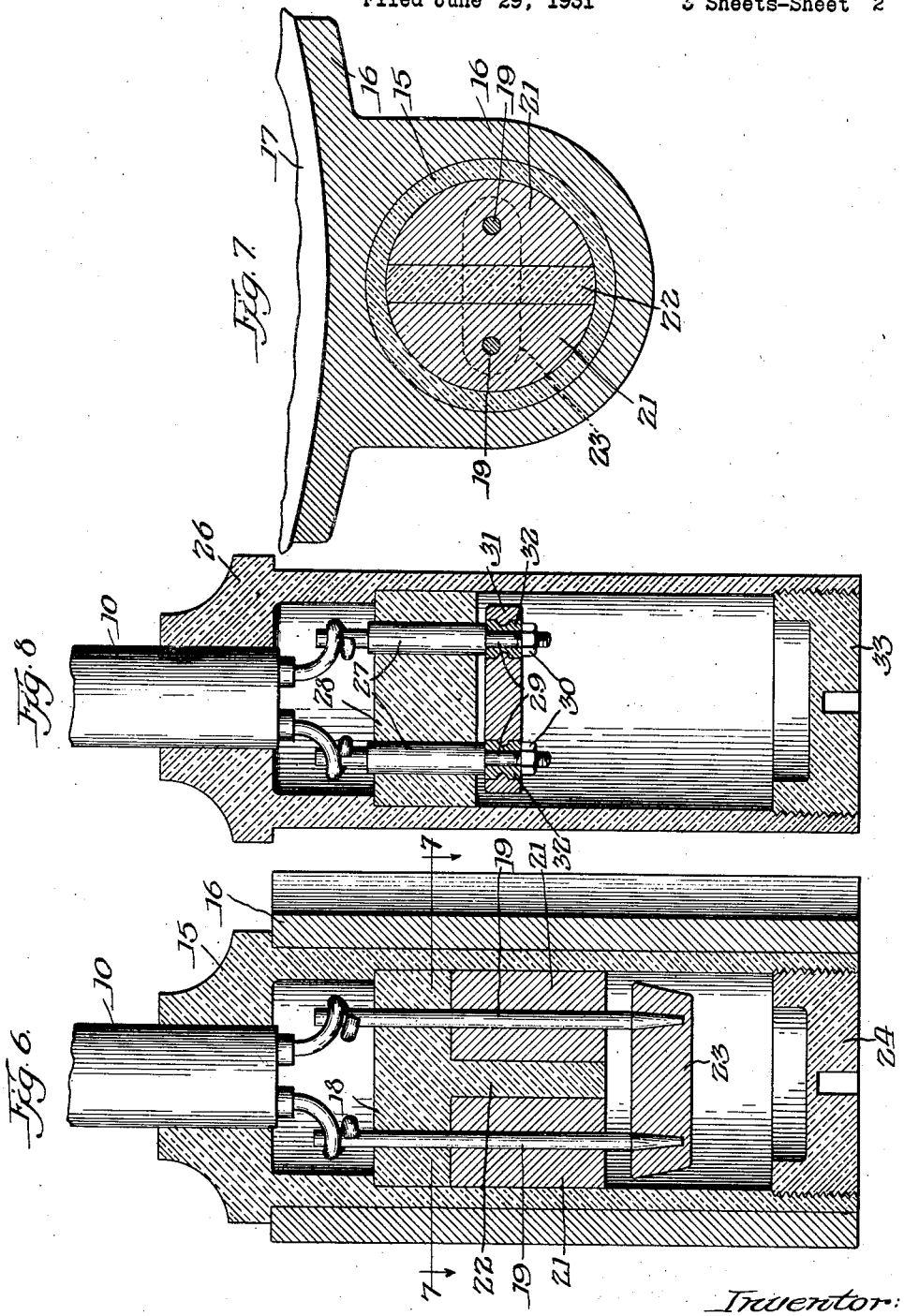

March 6, 1934.  C. E. L. LIPMAN  1,949,724
REFRIGERATOR CIRCUIT BREAKER
Filed June 29, 1931  3 Sheets-Sheet 3
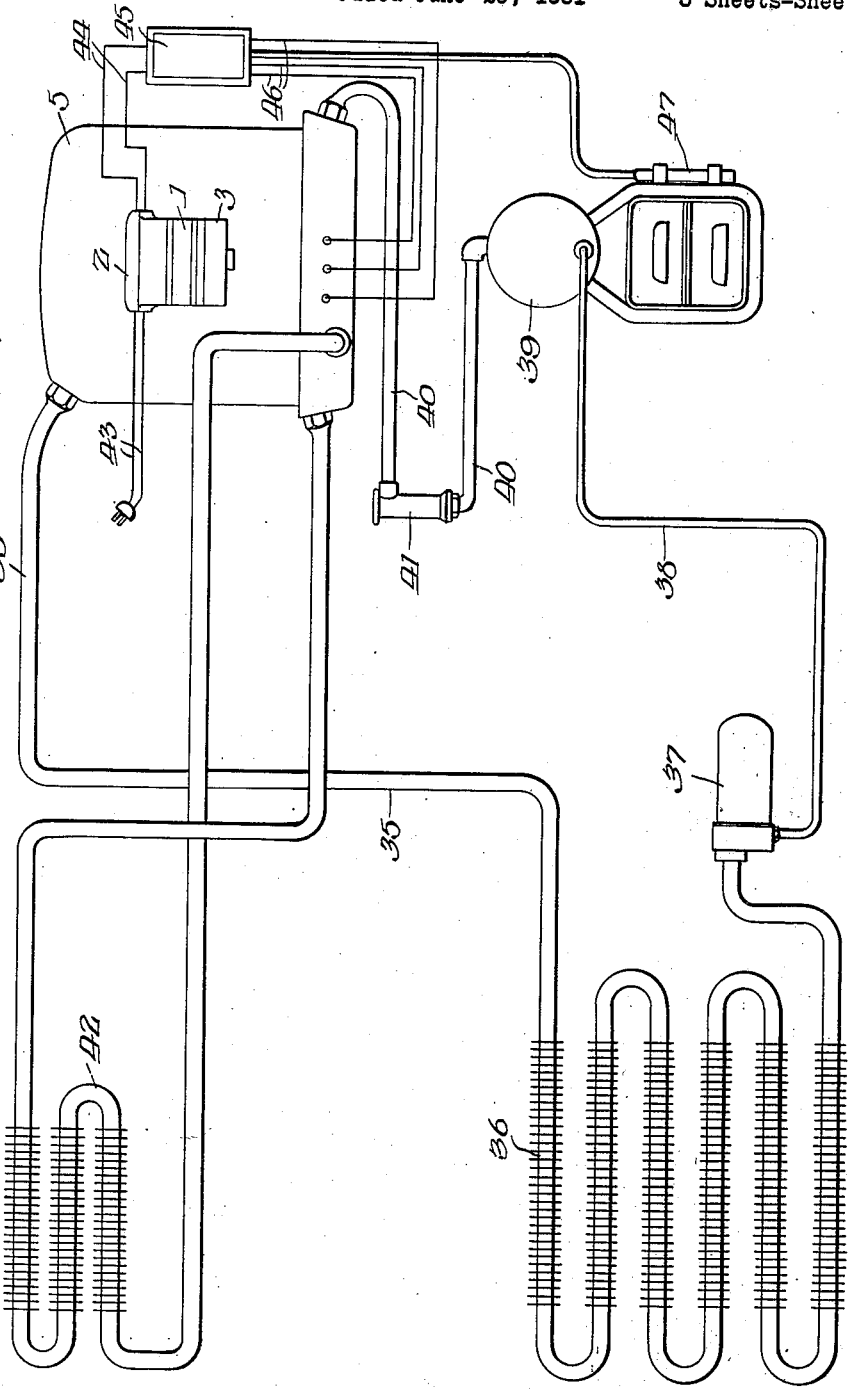

Patented Mar. 6, 1934

1,949,724

UNITED STATES PATENT OFFICE 1,949,724

REFRIGERATOR CIRCUIT BREAKER

Carl E. L. Lipman, Chicago, Ill., assignor to Lipman Patents Corporation, Chicago, Ill., a corporation of Delaware Application June 29, 1931, Serial No. 547,517

4 Claims. (Cl. 62—4)

This invention relates to a circuit breaker particularly suited for use with an electrically driven hermetically sealed refrigeration and operable to interrupt the current to the driving motor of the refrigerator unit if the temperature of the unit should rise to a predetermined degree.

A sealed refrigerator unit provides problems and dangers peculiar to itself due to the fact that a refrigerant in the form of an expansible gas and a heat generating element are hermetically sealed in a common casing. For example there is some danger that the refrigerant under pressure may reach unsafe pressures if the motor becomes unduly heated.

Experience has shown that in some instances the usual electrical portective devices such as electrical fuses, circuit breakers, and overload devices sometimes fail and are not therefore always sufficient to give the desired and necessary protection. Failure of one of the above safety devices to operate upon overloading of the motor and cut off the current will permit an undue temperature rise in the motor with the result that the temperature of the refrigerant under pressure within the casing rises which further increases the pressure of the refrigerant at a rapidly increasing rate to a point where it may be unsafe.

It is the purpose of this invention to prevent the occurrence of unsafe pressures within the casing of a hermetically sealed refrigerating unit by providing a circuit breaker which will positively interrupt the current supply to the motor of the unit upon undue rise in temperature of the unit and do so independently of the other usual auxiliary electrical safety devices such as electric circuit breakers, fuses, and overload cut-outs.

In accordance with this invention a mechanical cut-out is incorporated in the current supply circuit to the sealed-in motor, in heat conductive relation to the unit. The cut-out is thereby directly responsive to the temperature of the unit independently of all other safety devices and is operative to open the circuit upon undue rise in temperature of the unit.

A better understanding of this invention and its novel features and full advantages will be apparent from a consideration of the following description given in connection with the drawings, in which:

Fig. 1 is a front elevation of a circuit breaking device constructed in accordance with this invention, a portion of the outer casing being broken away to illustrate the interior construction.

Fig. 2 is a top plan view of the device with the cover removed.

Fig. 3 is a vertical transverse section taken on line 3—3 of Fig. 1.

Fig. 4 is a similar section taken on line 4—4 of Fig. 1.

Fig. 5 is a horizontal transverse section taken on line 5—5 of Fig. 1.

Fig. 6 is a vertical section taken through the center of a modified form of cut-out.

Fig. 7 is a horizontal transverse section taken on line 7—7 of Fig. 6.

Fig. 8 is a similar section taken through a still further modified form.

Fig. 9 is a schematic diagram of a complete refrigerating system.

Referring more particularly to the form of this invention illustrated in Figs. 1 to 5 inclusive, a mechanical circuit breaker for both leads of the supply circuit is shown. The entire device is housed within a container preferably molded of bakelite and comprising a body 1, top cap 2 and lower fuse cup 3, the three sections being held together by cap screws 4. The back of the casing is concaved to fit against the outer periphery of the refrigerator unit casing 5 which in the present instance is shown as being cylindrical, a portion of the unit casing being shown in Fig. 2.

The interior of the body section is provided with four integral and spaced sleeve-like bosses 6 within which are secured two pairs of conductors 7 the upper ends of which project as at 8 into the cap the lower ends of which are tapered and project as at 9 into the lower cup. The space between the bosses is preferably filled with some good heat conducting material 11 such as copper or aluminum which is also concaved at the rear of the casing to contact with the unit casing. The filler 11 constitutes a good conducting medium to conduct the heat of the unit into proximity of the conductors 7. The lower projecting ends 9 of each pair of conductors 7 are bridged by a fusible alloy block 12, the block being heavy enough to carry the required current without offering undue resistance thereto and being small enough to be spaced from the walls of the cup.

It is understood of course that the supply leads 10 to the motor within the hermetically sealed casing 5 are led through the circuit breaking device and are secured to the projecting ends 8 of the conductors, the connections being clearly shown in Fig. 2 from which it will be seen that one fusible alloy block 12 is inserted in each of the leads.

In Figs. 6 and 7 there is shown a slightly modified form of the invention, in which a fusible block is inserted in only one lead. In this form a fusible alloy block is carried by a hollow cylindrical plug-like member 15 formed of bakelite or some suitable insulating material which is adapted to be received within a heat transfer socket 16 formed of some good heat conducting material and which in turn is secured to the outer surface of the hermetically sealed casing 17 (Fig. 7) housing the refrigerating unit.

Within the plug 15 is secured an insulating block 18 which supports a pair of conducting pins 19 in spaced relation. Surrounding each conducting pin 19 is a heat conducting block 21 the two blocks being insulated from each other by a depending tongue 22 of the insulator 18. Bridged across the lower ends of pins 19 is a fusible alloy block 23 the block being molded or cast upon the ends of the pins and being free from all adjacent surfaces. The lower end of the plug 15 may be closed if desired by a screw cap 24.

In Fig. 8 there is shown a still further modified form in which one lead only is protected and in which the fusible alloy block is removable and replaceable.

As in the form illustrated in Figs. 6 and 7 the device is housed within a hollow cylindrical plug 26 formed of bakelite or some suitable material and within which are supported a pair of spaced conducting pins 27 carried by an insulating block 28. The lower ends of the pins are reduced in diameter as at 29 and threaded to receive nuts 30. A fusible alloy block 31 instead of being cast or molded directly upon the pins as in the former instances, has molded therein a pair of ferrules 32 which fit upon the lower reduced ends of the pins and are retained thereon by nuts 30. It follows from the above that the fusible alloy block upon melting will slide off the ferrules after which the latter may be removed and a new fusible block substituted. As in the former case the plug may be closed at its lower end by a threaded cap 33 and is arranged to be inserted in a heat conducting socket member similar to 16.

In Fig. 9 there is illustrated diagrammatically a complete refrigerating system embodying the motor compressor unit 5 and a circuit breaker of the type shown in Figs. 1 to 5. The motor compressor unit is arranged to deliver refrigerant under pressure through pipe 35 to a condenser 36 which liquefies the refrigerant and delivers the same to a float chamber 37. From the float chamber 37 the liquid refrigerant flows through pipe 38 to an evaporator 39. From the evaporator 39 the vaporized refrigerant is drawn up through pipe 40 which includes the check valve 41 into the compressor. In the illustrated form an oil cooler 42 is shown for cooling some or all of the lubricating oil for the motor compressor unit.

The supply of current is taken in through a pair of leads 43 and carried through the circuit breaker 1 and by conductors 44 to a control box 45 which houses the usual relays, overload devices and thermo-control switches. From the control box 45 the usual supply leads 46 extend to the motor. A thermo-unit 47 is shown attached to the evaporator and connected to the control box.

From the foregoing description of the various illustrated forms of this invention it is believed that the operation will be apparent without a detailed description thereof for which reason the operation will be merely briefly described.

As previously stated, a sealed refrigerating unit in which the motor compressor unit is hermetically sealed within a casing which also receives the discharged refrigerant from the compressor presents peculiar problems and dangers should the current to the driving motor not be interrupted upon the occurrence of any mechanical electrical difficulties. Under such conditions the continued supply of current increases the temperature of the unit and due to the expansible nature of the refrigerant a rupture of parts may result.

By this invention there is provided a mechanical circuit breaker which is independent of any electrical devices which may also be used in conjunction therewith and which positively opens the circuit at any predetermined temperature. Upon a predetermined rise in temperature the fusible alloy block, which is selected for any desired temperature, fuses and falls free of the conductors. It has been found desirable to form the fusible block absolutely free of all adjacent surfaces in order that upon partial fusion the block will fall by gravity into the cup and the surface tension of the fusible alloy will not retain the block upon the conductors. In the form illustrated in Fig. 8, cap 33 may be removed and a new fusible alloy block inserted.

It will be obvious that the forms shown in Figs. 6, 7, and 8 may be duplicated to provide protection for both leads and that the various features illustrated in these latter figures may be incorporated if desired in the embodiment of this invention disclosed in Figs. 1 to 5 inclusive.

It will also be apparent to those skilled in the art that various modifications may be made in the structural details of the illustrated forms of this invention without departing from the spirit and scope of the invention as defined in the claims.

I claim:

1. The combination with an electrically driven hermetically sealed refrigerating unit comprising a motor compressor unit enclosed by a sealed casing into which the compressor discharges gaseous refrigerant, of a fusible conductive element disposed exterior of the casing and in heat conductive relation thereto, said fusible element being connected in and bridging a gap in the supply circuit to said motor, and being arranged to fall by gravity upon fusion to open the gap and interrupt the motor circuit to prevent undue rise of temperature in the casing and consequent expansion of gaseous refrigerant therein.

2. The combination with an electrically driven hermetically sealed refrigerating unit comprising a motor compressor unit enclosed by a sealed casing into which the compressor discharges gaseous refrigerant, of a heat transfer element exterior of said casing, a fusible conductive element disposed exterior of the casing and in heat conductive relation to said transfer element, said fusible element being connected in and bridging a gap in the supply circuit to said motor, and being arranged to fall by gravity upon fusion to open the gap and interrupt the motor circuit to prevent undue rise of temperature in the casing and consequent expansion of gaseous refrigerant therein.

3. The combination with an electrically driven hermetically sealed refrigerating unit comprising a motor compressor unit enclosed by a sealed casing into which the compressor discharges gaseous refrigerant, of a removable and renewable fusible conductive element disposed exterior of the casinging and in heat conductive relation thereto, said fusible element being connected in and bridging a gap in the supply circuit to said motor, and being arranged to fall by gravity upon fusion to open the gap and interrupt the motor circuit to prevent undue rise of temperature in the casing and consequent expansion of gaseous refrigerant therein.

4. The combination with an electrically driven hermetically sealed refrigerating unit comprising a motor compressor unit enclosed by a sealed casing into which the compressor discharges gaseous refrigerant in contact with the interior surface of said casing, of a fusible electric conductive element disposed exterior of the casing and in heat conductive relation thereto, said fusible element being connected in and bridging a gap in the supply circuit to said motor, and being arranged upon fusion thereof to open the gap and interrupt the motor circuit to prevent undue rise of temperature in the casing and the consequent expansion of gaseous refrigerant therein.

CARL E. L. LIPMAN.